Sept. 7, 1965 D. H. RUMBLE 3,205,311

MULTIPLEXING AND COMMUNICATION SYSTEM WITH HIGHLY DAMPED GATED SIGNAL GENERATOR

Filed May 17, 1961

INVENTOR
D. H. RUMBLE

BY D. Kendall Cooper
ATTORNEY 3,205,311

MULTIPLEXING AND COMMUNICATION SYSTEM WITH HIGHLY DAMPED GATED SIGNAL GENERATOR

Dale H. Rumble, Carmel, N.Y., assignor to International Business Machines Corporation, New York, N.Y., a corporation of New York Filed May 17, 1961, Ser. No. 110,739
7 Claims. (Cl. 179—15)

This invention relates to communication systems, and more particularly to a data multiplexing and communication system.

Communication facilities are being used in ever increasing numbers for transmission of data in commercial and scientific endeavors. Since the frequency spectrum available for these purposes is inherently limited in range, the increased requirements have resulted in crowded bandwidths. This has placed restrictions on equipment designers and users alike, since equipment must stay within accurately defined boundaries in assigned bandwidths. In addition, efforts for even greater usage have been hampered.

Conventional data multiplexing systems in the prior art have operated within a defined bandwidth and have supplied signals at discrete frequencies over the given baseband bandwidth by amplitude modulating or angle modulating techniques (phase or frequency) which require the provision of one or more stable oscillators and mixers for each channel of information as well as selective filters. The individual channel modulating signals have been applied to a common carrier for transmission to one or more receivers.

Other systems have contemplated the provision of a single carrier with means for varying its basic frequency. This is achieved by switching in any of a plurality of crystals for controlling the frequency. Still other prior art systems contemplate a single signal source with utilization of the sub-harmonic signals and recombination of the same to form a composite signal for transmission of significant information. Other systems in the prior art envisage the production of a train of pulses for each of a selected number of channels, means for amplitude modulating each train and further means for interleaving the pulse trains to form a composite wave. Circuits have also been presented in the prior art for the periodic development of a short high frequency pulse such as that required in a radio echo ranging system, but no extension of this has been made into data transmission areas.

The present invention has particular application in baseband communication systems where the ratio of upper frequency limitations to lower frequency limitations of the band is quite large due to the fact that a great number of channels is being handled and that the range of frequencies generated during the transmission process is consequently wider in range than other systems. Typical baseband systems well known in the art are those employed for the transmission of picture signals and synchronizing signals in the television art as well as those set aside for transmission of pulses in multichannel telephone systems.

Where individual oscillating circuits are provided for each channel in the prior art systems, they have invariably been operated in a continuous manner, each at a different frequency, but each at a frequency far enough removed from the frequencies of other channels to minimize interference among the channels. In addition, noise and drift problems have been inherent in prior art systems which have oscillators and mixers for each channel. It has been difficult to reduce these factors to a satisfactory minimum.

Accordingly, an object of the invention is to provide a data multiplexing and communication system which can accommodate a greater number of information channels within a given bandwidth, or as a corollary, can accommodate a given number of channels within a reduced bandwidth.

Another object of the invention is to provide a multiplexing and communication system wherein a considerable reduction in noise is realized.

Still another object of the invention is to provide a multiplexing and communication system in which frequency drift problems are minimized.

A further object of the invention is to provide a greatly simplified system for multiplexing a number of data transmission channels which operates efficiently and accurately.

In order to accomplish these and other objects, there has been provided in accordance with the present invention, a data transmission system wherein each of a number of data channels is supplied with a signal generating circuit that is temporarily gated on in response to significant data signals, and wherein the individual channel signals are combined for transmission purposes, and subsequently separated at the receiving end of the system for utilization.

The foregoing and other objects, features and advantages of the invention will be apparent from the following more particular description of the preferred embodiment of the invention as illustrated in the accompanying drawings.

*Description*

Figure 1:
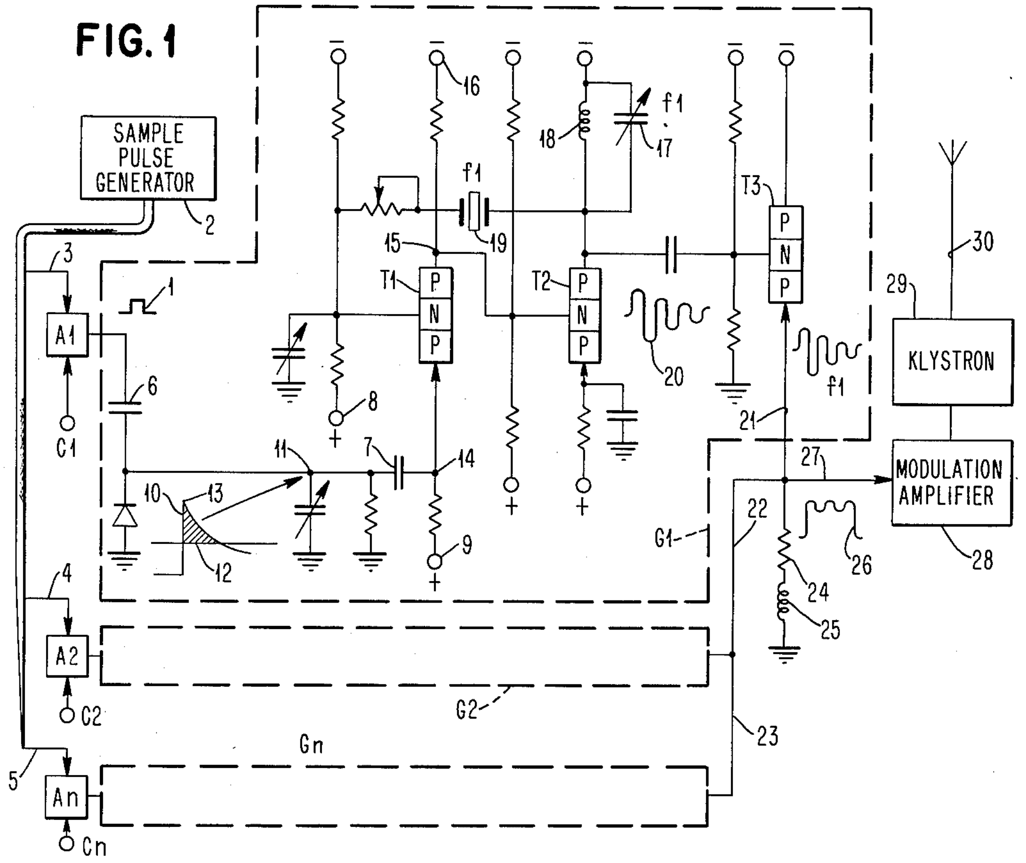
FIG. 1 represents a data multiplexing and transmission circuit in accordance with the principles of the invention.

Referring to FIG. 1, a number of data channels C1–C*n* feed into associated gates A1–A*n*. In a typical system, significant data signals on the channel lines C1–C*n* would assume zero or one level corresponding to their binary zero or binary one data bit counterparts in a character of information, from a source, not shown. For purposes of description, it is assumed in the system shown that a binary one in a particular channel, such as channel C1, is represented by a + waveform or pulse such as the pulse 1. If binary ones exist in the other data channels C2–C*n*, positive pulses like the pulse 1 would be present on the respective lines.

A common sample pulse generator 2 is connected by lines 3–5 in order to gate each of the respective channel gates A1–A*n* at a different time. The sample pulse generator 2 preferably supplies + levels to each of the gates in succession.

Associated with channel C1 is an amplifier circuit or gated signal generator generally indicated by a dashed outline designated G1. A corresponding signal generator G2 is associated with channel C2, and a generator G*n* is associated with the channel C*n*.

As indicated in FIG. 1, the generator G1 comprises a number of transistors T1–T3, which in this case are of the PNP type, but which could readily be of the NPN type with the application of signal levels of opposite polarities. A number of biasing terminals with — and + levels are also shown in the circuit of G1.

Gated outputs from gate A1 are directed through a capacitor 6 and a capacitor 7 to the emitter of transistor T1. With appropriate + levels from terminals 8 and 9, the transistor T1 is ordinarily reverse biased, so that it does not conduct.

When an output is available from gate A1 due to the presence of a + level on C1 and a + sampling pulse, a differentiated signal as indicated by the waveform 10 is available at a terminal 11. Normally, the level of signal at terminal 11 lies below the line 12 which separates the upper and lower portions of the waveform 10. With a positive level below the line 12, transistor T1 is biased off, and is in its normal condition. The sudden application of a pulse, such as pulse 1, to the generator circuit G1 results in the development of the differentiated peak 13 on the waveform 10. Passage of this peaked signal through the capacitor 7 to the terminal 14 results in the transistor T1 being in a forward biased condition, since its emitter is connected to terminal 14 and its base becomes negative with respect to its emitter.

At this time, the collector 15 of transistor T1 becomes more negative due to the negative biasing potential from terminal 16. The negative level at the collector 15 of transistor T1 is directly applied to the base of transistor T2. T2 is then forward biased and both transistors T1 and T2 will tend to oscillate at a frequency *f*1 determined by the variable capacitor 17 and the inductance 18 with stability of oscillation assured by the crystal 19.

The duration of oscillation is controlled by the duration of the applied pulse 1 as more specifically reflected in the waveform 10. This output is an undistorted damped sine wave, as indicated by the waveform 20, which has a frequency *f*1 corresponding to the frequency of the oscillating circuit. A transistor T3 serves as an emitter follower and transfers the signal essentially unmodified on the G1 output line 21.

Each of the other signal generators G2–G*n* has circuitry similar to that shown for generator G1, with the exception that each would have a unique oscillating frequency at which it operates. Each of the generators G1–G*n* has a high Q or high damping factor which permits accurate adjustment within the circuit to limit the number of cycles of ringing in the waveform 20, consistent with establishing a satisfactory compatability with the rate of presentation of data pulses from the respective channels.

Since all channels are gated in succession by the sample pulse generator 2, outputs will be present on the lines 21 from G1, 22 from G2, and 23 from G*n* in succession, if the aforementioned significant data pulses or + levels exist on the respective channel lines.

A common resistance-inductance adder or R–L network comprising the resistance 24 and the inductance 25 is provided to develop a combined video signal such as that represented by the waveform 26. The waveform developed from the R–L network or adder is applied on the line 27 to a frequency modulation amplifier 28 for application to a klystron 29, and for propagation from an antenna 30. Methods of modulation, other than frequency modulation, could readily be used.

Figure 2:
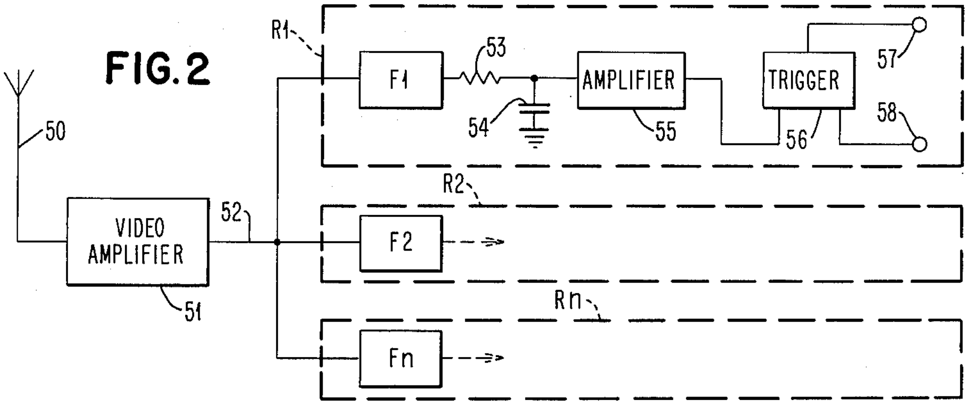
FIG. 2 represents a data receiving circuit for use with the circuit of FIG. 1.

Referring now to FIG. 2, the propagated signal from the transmitter of FIG. 1 is received through an antenna 50, and applied to a video amplifier 51. The output of the video amplifier 51 is applied by line 52 to a plurality of filters F1–F*n* which are associated with receiving circutis R1–R*n*.

Each of the receiving circuits R1–R*n* is arranged in a manner comparable to that shown for R1 with the filter feeding into an integrating network comprising resistor 53 and capacitor 54, into an amplifier 55, and subsequently to a bistable trigger 56.

Each of the filters F1–F*n* is sharply tuned to a frequency that corresponds to its transmitting channel counterpart C1–C*n*. The composite video signal on line 52 is in this manner separated in order to develop a setting pulse for each of the triggers in the respective receiving circuits. If a pulse such as pulse 1 in FIG. 1 were present and had gated the generator G1, the generated signal at frequency *f*1 would be passed by the filter F1 and through the amplifier 55 to set the trigger 56. The trigger 56 could then be maintained in a set condition for a desired period of time in order to supply a 1 bit signal level at the terminal 57 until reset by a reset pulse from the terminal 58.

The individual circuits such as the gates, the modulation amplifier, the video amplifier, the filters and the triggers are within the knowledge of those skilled in the art at this time, but for reference purposes, adequate discussion of these circuits can be found in the books "Electronic Circuits and Tubes," Cruft Electronics Staff, McGraw-Hill Book Co., 1947; and "Pulse and Digital Circuits" Jacob Millman and Herbert Taub, McGraw-Hill Book Co., 1956.

Since each of the signal generators G1–G*n* is gated on only briefly, interference among the channels is substantially eliminated. In addition, frequency drift and instability normally encountered in systems using continuously running oscillators is also eliminated. With the reduction of interference and drift problems, frequency assignments for the respective channels can be much closer together, and a greater number of channels can be accommodated in a given bandwidth.

It is apparent from the foregoing discussion that a novel data multiplexing and communication system has been provided which insures a more efficient use of available transmission bandwidths and in which noise and other disturbances normally associated with conventional transmission circuits are substantially minimized.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for multiplexing data bit signals representing binary coded character permutations, comprising means for selectively impressing said signals on a plurality of signal channels; individual gated amplifier means respectively associated with each of said channels and arranged for generation of a damped oscillatory signal at a unique frequency when gated, means for sequentially scanning each of said channels and for momentarily gating the related channel amplifier when a data bit signal has been impressed on said channel to provide a signal burst at the said channel's unique frequency; circuit means for forming a combined signal from the respective outputs of any gated amplifiers; means for generating a high frequency carrier signal; and means for modulating said carrier signal with said combined signal.

2. Apparatus for multiplexing significant signals, comprising means for selectively impressing said signals on a plurality of signal channels; individual gated amplifier means respectively associated with each of said channels and arranged for generation of a damped oscillatory signal at a unique frequency when gated, means for sequentially scanning each of said channels and for momentarily gating the related channel amplifier when a significant signal has been impressed on said channel to provide a signal burst at the said channel's unique frequency; circuit means for forming a combined signal from the respective outputs of any gated amplifiers; means for generating a high frequency carrier signal; and means for modulating said carrier signal with said combined signal.

3. Apparatus for multiplexing data bit signals representing binary coded character permutations, comprising means for selectively impressing said signals in a parallel on a plurality of related signal channels; individual gated amplifier means respectively associated with each of said channels, each of said amplifier means being tuned to a unique frequency and responsive to a gating signal to produce a highly damped oscillatory output; means for sequentially scanning each of said channels and for momentarily gating the related channel amplifier when a data bit signal has been impressed on said channel to provide a signal burst at the said channel's unique frequency; circuit means for forming a combined signal from the respective outputs of any gated amplifiers; means for generating a high frequency carrier signal; and means for frequency modulating said carrier signal with said combined signal.

4. Apparatus for multiplexing data bit signals representing binary coded character permutations, comprising means for selectively impressing said signals in parallel on a plurality of signal channels; individual amplifier means respectively associated with each of said channels, each of said amplifier means being crystal tuned to a unique frequency and responsive to a gating signal to produce a highly damped oscillatory output; means for sequentially scanning each of said channels and for momentarily gating the related channel amplifier when a data bit signal has been impressed on said channel to provide a signal burst at the said channel's unique frequency; circuit means for forming a combined signal from the respective outputs of any gated amplifiers; means for generating a high frequency carrier signal; means for frequency modulating said carrier signal with said combined signal, receiver means responsive to said combined modulated signal for amplifying the same, a plurality of utilization circuits, and individual discriminating means associated with each of said circuits for extracting a portion of said combined signal.

5. Apparatus for multiplexing data bit signals representing binary coded character permutations, comprising means for selectively impressing said signals in parallel on a plurality of signal channels; individual amplifier means respectively associated with each of said channels, each of said amplifier means being crystal tuned to a unique frequency and responsive to a gating signal to produce a highly damped oscillatory output; means for sequentially scanning each of said channels and for momentarily gating the related channel amplifier when a data bit signal has been impressed on said channel to provide a signal burst at the said channel's unique frequency; circuit means for forming a combined signal from the respective outputs of any gated amplifiers; means for generating a high frequency carrier signal; means for frequency modulating said carrier signal with said combined signal, receiver means responsive to said combined modulated signals for amplifying the same, a plurality of utilization circuits corresponding in number with and respectively associated with said signal channels, and individual discriminating means associated with each of said circuits for extracting the portion of said combined signal representing information from said associated signal channel.

6. Apparatus for multiplexing data bit signals representing binary coded character permutations, comprising means for selectively impressing said signals in parallel on a plurality of signal channels; individual amplifier means respectively associated with each of said channels, each of said amplifier means being crystal tuned to a unique frequency and responsive to a gating signal to produce a highly damped oscillatory output; means for sequentially scanning each of said channels and for momentarily gating the related channel amplifier when a data bit signal has been impressed on said channel to provide a signal burst at the said channel's unique frequency; circuit means for forming a combined signal from the respective outputs of any gated amplifiers; means for generating a high frequency carrier signal; means for frequency modulating said carrier signal with said combined signal, receiver means responsive to said combined modulated signals for amplifying the same, a plurality of utilization circuits corresponding in number with and respectively associated with said signal channels, and individual frequency discriminating means associated with each of said circuits for extracting the portion of said combined signal representing information from said associated signal channel.

7. A multiplex system for transmitting signals from a plurality of data channels, comprising:

means for sequentially scanning the data channels and operable to produce a signal indicating the presence of a data signal on a channel being scanned;

a high Q oscillator for each channel arranged to oscillate at an amplitude that depends on the value of a controlling signal, each oscillator being tuned to a unique frequency;

means for each channel responsive to said signal indicating the presence of a data signal on the associated channel to produce a signal controlling the oscillator of the associated channel to produce an oscillatory output that is damped to a low amplitude within the interval of transmitting data of the associated channel; and means for combining the output of each said oscillator for transmission.

References Cited by the Examiner

UNITED STATES PATENTS

| | | | |
|---|---|---|---|
| 2,272,070 | 2/42 | Reeves | 178—43.5 |
| 2,369,662 | 2/45 | Deloraine et al. | 243—203 |
| 2,490,039 | 12/49 | Earp | 179—15 |
| 2,542,592 | 2/51 | Styren | 179—84 |
| 2,631,275 | 3/53 | Finlay | 178—66 |
| 2,705,795 | 4/55 | Fisk et al. | 343—203 |
| 2,895,128 | 7/59 | Bryden | 343—203 |
| 3,016,426 | 1/62 | Entz | 179—84 |
| 3,084,223 | 4/62 | Marcantili et al. | 179—15 |

DAVID G. REDINBAUGH, *Primary Examiner.*

ROBERT H. ROSE, *Examiner.*